UNITED STATES PATENT OFFICE.

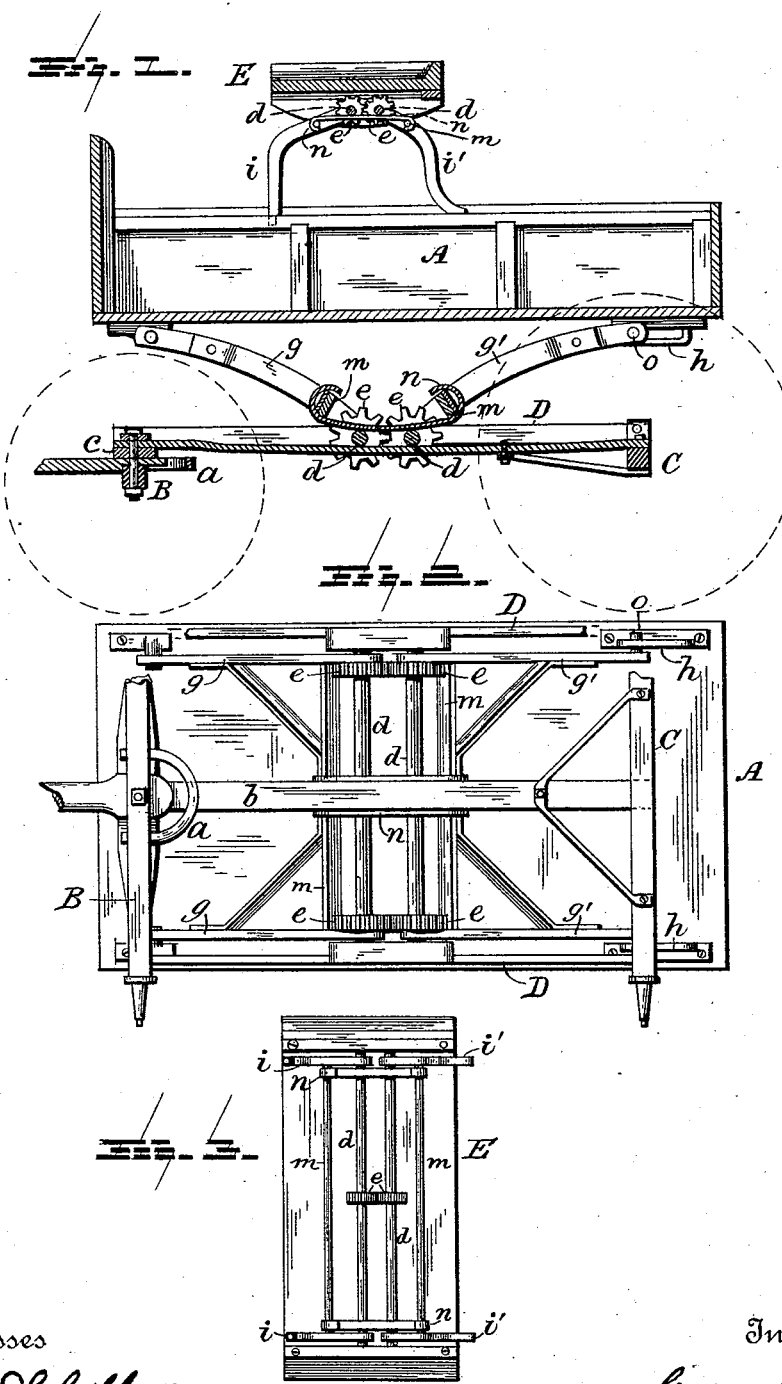

GEORGE E. COMBS, OF UTICA, NEW YORK.

SPRING FOR VEHICLES.

SPECIFICATION forming part of Letters Patent No. 454,714, dated June 23, 1891.

Application filed April 4, 1891. Serial No. 387,620. (No model.)

*To all whom it may concern:*

Be it known that I, GEORGE E. COMBS, a citizen of the United States, residing at Utica, in the county of Oneida and State of New York, have invented certain new and useful Improvements in Springs for Vehicles; and I do hereby declare the following to be a full, clear, and exact description of the invention, such as will enable others skilled in the art to which it appertains to make and use the same.

The invention relates to springs for vehicles; and it consists in certain improvements in the construction of the same, as hereinafter described and claimed.

In the accompanying drawings, Figure 1 represents a vertical longitudinal section of a wagon provided with my improvements. Fig. 2 is a plan of the wagon inverted. Fig. 3 is a plan of the wagon-seat inverted.

A designates the wagon-box, B the front axle, and C the rear axle. The hounds $a$ and the reach $b$ are connected with the front axle in the usual manner. A bar $c$ is secured by the king-bolt at the center in position over the axle B.

D indicates two side bars, the forward ends of which rest on and are secured to the bar $c$, the rear ends of said side bars resting on the rear axle, to which they are secured. Two shafts $d$ are centrally mounted under the wagon-box, and are journaled in the side bars D or in bearings carried by said bars. On each shaft $d$, near its extremities, are mounted two pinions $e$, the said pinions being fast on the shafts, and so placed that the two pinions on one of the shafts $d$ connect with the two pinions on the other shaft, as shown. Two arms $g$ extend from the more forward shaft $d$, and are pivotally connected with the bottom of the wagon-box near the front, the rear ends of said arms being rigidly attached to the shaft. Two similar arms $g'$ extend rearward from the other shaft $d$, being rigidly attached to said shaft, and having their rear ends loosely connected with the bottom of the wagon-box near its rear end. The connection of arms $g'$ with the wagon-box is formed of elongated loops $h$, fastened to said box, and fixed pins extending laterally from said arms into said loop. The two sets of arms $g$ $g'$ are provided with cross-bars $m$, and a spring $n$ is connected with said cross-bars and retains the arms in positions inclining upward, as seen in Fig. 1. As will be seen, the rear arms $g'$ have a limited movement against the wagon-box at their rear ends, the pins $o$ moving in the loops $h$.

As the loaded wagon passes over uneven surfaces the outer ends of the arms $g$ $g'$ are pressed downward by the weight of the load and are raised again by the spring $n$. The pinions $e$ on one shaft $d$, engaging with the pinions on the opposite shaft, serve to equalize the pressure of the load, so that the wagon-box keeps its level position when the pressure is greatest, either in the front or rear part of the wagon.

The operative devices described may be applied to the seat of the vehicle.

E designates the seat, provided with the front and rear legs $i$ $i'$, which answer the purpose of the arms $g$ $g'$. The two parallel shafts $d$ are in this construction journaled in fixed bearings fastened to the seat at its extremities. The bent legs $i$ $i'$ are rigidly attached to the shaft $d$, the forward legs being removably connected with the wagon-box, and the rear legs resting on said box and having a movement thereon. Two pinions $e$ are made fast to shafts $d$, in position to connect with each other, and one or more springs $n$ are connected with the cross-rods $m$ of the front and rear legs. As the seat is depressed as the wagon passes over uneven surfaces, the front and rear legs are spread somewhat, the legs $i'$ sliding rearward on the surface on which they rest, but the latter are retracted by the action of the springs.

I claim—

1. The combination, with the body and the front and rear axles of a vehicle, of two side bars carried by said axles, two parallel rotative shafts journaled in said side bars and provided with pinions in position to connect and engage said shafts, two arms extending forward from one of said shafts and connected with the body of the vehicle, two arms extending rearward from the opposite shaft and loosely connected with the vehicle-body, and a spring connected with and adapted to raise said front and rear arms simultaneously, substantially as and for the purpose described.

2. The combination, with two parallel rotative shafts provided with fixed bearings, of two or more pinions secured to said shafts in positions to connect one with another, opposite arms fixed to said shafts and extending in opposite directions, and a retracting spring connected with said opposite arms, substantially as set forth and described.

3. The combination, with the body and the front and rear axles of a vehicle, of a bar c, connected with the front axle, side bars D, shafts d, journaled in said side bars and provided with connecting-pinions e, arms g, extending from one of the shafts d and connected with the vehicle-body, arms g', extending rearward from the other shaft d, and a retracting spring connected with arms g g', substantially as set forth and described.

In testimony whereof I affix my signature in presence of two witnesses.

GEORGE E. COMBS.

Witnesses:
JAMES T. NEY,
BRADFORD H. DIVINE.